United States Patent
Lee et al.

(10) Patent No.: US 10,750,533 B2
(45) Date of Patent: Aug. 18, 2020

(54) METHOD FOR TRANSMITTING OR RECEIVING UPLINK CONTROL INFORMATION IN WIRELESS COMMUNICATION SYSTEM, AND DEVICE THEREFOR

(71) Applicant: LG ELECTRONICS INC., Seoul (KR)

(72) Inventors: Hyunho Lee, Seoul (KR); Daesung Hwang, Seoul (KR); Yunjung Yi, Seoul (KR); Kyuhwan Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 16/090,272

(22) PCT Filed: Apr. 3, 2017

(86) PCT No.: PCT/KR2017/003624
§ 371 (c)(1),
(2) Date: Oct. 1, 2018

(87) PCT Pub. No.: WO2017/171516
PCT Pub. Date: Oct. 5, 2017

(65) Prior Publication Data
US 2019/0116611 A1    Apr. 18, 2019

Related U.S. Application Data

(60) Provisional application No. 62/316,681, filed on Apr. 1, 2016, provisional application No. 62/334,374, filed (Continued)

(51) Int. Cl.
*H04W 72/14* (2009.01)
*H04W 52/32* (2009.01)
(Continued)

(52) U.S. Cl.
CPC ......... *H04W 72/14* (2013.01); *H04W 52/325* (2013.01); *H04W 52/346* (2013.01);
(Continued)

(58) Field of Classification Search
CPC ..... H04W 72/14; H04W 72/12; H04W 72/04; H04W 52/325; H04W 52/346; H04W 72/1278; H04W 72/1284; H04W 72/1268
See application file for complete search history.

(56) References Cited

U.S. PATENT DOCUMENTS

2012/0044889 A1* 2/2012 Jen .................... H04L 1/1854
370/329
2012/0057516 A1* 3/2012 Ahn ................... H04L 5/0048
370/312

(Continued)

FOREIGN PATENT DOCUMENTS

WO    2016/040290 A1    3/2016

OTHER PUBLICATIONS

International Search Report and Written Opinion of the International Searching Authority dated Aug. 8, 2017 for Application No. PCT/KR2017/003624, 13 pages.

(Continued)

*Primary Examiner* — Kibrom T Hailu
(74) *Attorney, Agent, or Firm* — Park, Kim & Suh, LLC

(57) ABSTRACT

A method for transmitting an uplink signal for a terminal configured to support one or more transmission time interval (TTI) lengths in a wireless communication system according to an embodiment of the present invention, which is supported by a terminal, may comprise the steps of: receiving uplink grant for a plurality of cells; and if transmission timing of an uplink data channel and transmission timing of an uplink control channel according to the uplink grant overlap, transmitting uplink control information, depending (Continued)

on a relationship between a TTI length of the uplink data channel and a TTI length of the uplink control channel, through the uplink control channel or an uplink data channel of one cell among the plurality of cells.

8 Claims, 8 Drawing Sheets

Related U.S. Application Data on May 10, 2016, provisional application No. 62/406,380, filed on Oct. 10, 2016, provisional application No. 62/417,320, filed on Nov. 3, 2016, provisional application No. 62/421,282, filed on Nov. 12, 2016, provisional application No. 62/458,506, filed on Feb. 13, 2017, provisional application No. 62/459,610, filed on Feb. 16, 2017.

(51) Int. Cl.
    *H04W 52/34*     (2009.01)
    *H04W 72/12*     (2009.01)

(52) U.S. Cl.
    CPC ... *H04W 72/1278* (2013.01); *H04W 72/1284* (2013.01); *H04W 72/1268* (2013.01)

(56) References Cited

U.S. PATENT DOCUMENTS

| | | | |
|---|---|---|---|
| 2013/0039231 A1* | 2/2013 | Wang | H04W 72/10 370/280 |
| 2013/0235853 A1* | 9/2013 | Papasakellariou | H04W 72/0413 370/336 |
| 2014/0376471 A1* | 12/2014 | Nishio | H04W 52/30 370/329 |
| 2016/0021653 A1 | 1/2016 | Papasakellariou et al. | |
| 2016/0192386 A1* | 6/2016 | Kim | H04W 72/1284 370/329 |
| 2016/0278074 A1* | 9/2016 | Yang | H04L 1/1812 |
| 2017/0290008 A1* | 10/2017 | Tooher | H04L 1/0007 |
| 2018/0041857 A1* | 2/2018 | Ouchi | H04W 8/24 |

OTHER PUBLICATIONS

Huawei et al., "Open Issues on UCI Transmission in case of Configuration of Simultaneous PUCCH and PUSCH", R1-160287, 3GPP TSG RAN WG1 Meeting #84, Feb. 6, 2016, 3 pages.
Samsung, "Remaining Issues on UCI Transmission in case of Simultaneous PUCCH and PUSCH in eCA", R1-160502, 3GPP TSG RAN WG1 Meeting #84, Feb. 6, 2016, 2 pages.
Huawei et al., "UCI Transmission for eLAA", R1-160747, 3GPP TSG RAN WG1 Meeting #84, Feb. 6, 2016, 2 pages.

\* cited by examiner

METHOD FOR TRANSMITTING OR RECEIVING UPLINK CONTROL INFORMATION IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2017/003624, filed on Apr. 3, 2017, which claims the benefit of U.S. Provisional Application No. 62/316,681, filed on Apr. 1, 2016, U.S. Provisional Application No. 62/334,374, filed on May 10, 2016, U.S. Provisional Application No. 62/406,380, filed on Oct. 10, 2016, U.S. Provisional Application No. 62/417,320, filed on Nov. 3, 2016, U.S. Provisional Application No. 62/421,282, filed on Nov. 12, 2016, U.S. Provisional Application No. 62/458,506, filed on Feb. 13, 2017, and U.S. Provisional Application No. 62/459,610, filed on Feb. 16, 2017, the contents of which are all hereby incorporated by reference herein in their entirety.

TECHNICAL FIELD

The present invention relates to a wireless communication system, and more particularly, to a method of transmitting or receiving uplink control information in a wireless communication system and an apparatus therefor.

BACKGROUND ART

In a wireless cellular communication system, discussion on a transmission/reception method capable of reducing latency as much as possible is in progress. In particular, according to the method, data is transmitted as soon as possible within a short time period using a short TTI (transmission time interval) for a service/UE sensitive to latency and a response is transmitted within a short time period in response to the data. On the contrary, it is able to transmit/receive data using a longer TTI for a service/UE less sensitive to latency. For a service/UE sensitive to power efficiency rather than latency, it may be able to repeatedly transmit data using the same low power or transmit data by more extending a TTI. The present invention proposes a method transmitting or receiving uplink control information that enables the operations above to be performed.

DISCLOSURE OF THE INVENTION

Technical Task

The present invention proposes a method of allocating, transmitting, or receiving an uplink control information resource in a wireless communication system and an operation related to the method.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting uplink control information for a terminal configured to support one or more TTI (transmission time interval) lengths in a wireless communication system, the method being performed by the terminal and includes receiving an uplink grant for a plurality of cells and when a transmission timing of an uplink data channel based on the uplink grant is overlapped with a transmission timing of an uplink control channel, transmitting uplink control information on an uplink data channel or the uplink control channel of a cell among the plurality of cells based on a relationship between a TTI length of the uplink data channel and a TTI length of the uplink control channel.

Additionally or alternatively, when the TTI length of the uplink data channel is shorter than the TTI length of the uplink control channel, the uplink control information can be transmitted on a cell on which an uplink data channel having the shortest TTI length is transmitted among the plurality of cells.

Additionally or alternatively, when the plurality of cells transmit uplink data channels having the same TTI length, the uplink control information can be transmitted in a predetermined cell determined by a predetermined rule.

Additionally or alternatively, when the TTI length of the uplink data channel is equal to or greater than a predetermined value, the uplink control information can be transmitted on the cell on which the uplink data channel having the shortest TTI length is transmitted among the plurality of cells.

Additionally or alternatively, when the TTI length of the uplink control channel is equal to or less than a predetermined value, uplink control information transmitted on an uplink data channel of a cell of the plurality of cells may correspond to a part of uplink control information to be transmitted on the control channel.

Additionally or alternatively, when the uplink data channel and the uplink control channel are simultaneously transmitted in a subframe, the remaining uplink control information other than the part of the uplink control information is transmitted or dropped on the uplink control channel, and when the uplink data channel and the uplink control channel are not simultaneously transmitted in a subframe, the remaining uplink control information can be dropped.

Additionally or alternatively, when the uplink data channel and the uplink control channel are not simultaneously transmitted in a subframe, the uplink data channel is dropped and the uplink control information can be transmitted on the uplink control channel.

Additionally or alternatively, when the TTI length of the uplink data channel is equal to or longer than the TTI length of the uplink control channel and the TTI length of the uplink control channel is equal to or shorter than a predetermined value, the uplink control information can be transmitted on a cell on which an uplink data channel having the shortest TTI length is transmitted among the plurality of cells.

Additionally or alternatively, when the TTI length of the uplink data channel is equal to or longer than the TTI length of the uplink control channel and the TTI length of the uplink control channel is equal to or shorter than a predetermined value, a part of uplink control information to be transmitted on the control channel can be transmitted on a cell on which an uplink data channel having the shortest TTI length is transmitted among the plurality of cells.

Additionally or alternatively, when the uplink data channel and the uplink control channel are simultaneously transmitted in a subframe, the remaining uplink control information other than the part of the uplink control information is transmitted or dropped on the uplink control channel, and when the uplink data channel and the uplink control channel are not simultaneously transmitted in a subframe, the remaining uplink control information can be dropped.

Additionally or alternatively, when the uplink data channel and the uplink control channel are not simultaneously transmitted in a subframe, the uplink data channel is dropped and all or a part of the uplink control information can be transmitted on the uplink control channel.

Additionally or alternatively, the uplink data channel is dropped and a part of the uplink control information can be transmitted on the uplink control channel irrespective of whether or not the uplink data channel and the uplink control channel are simultaneously transmitted in a subframe.

To further achieve these and other advantages and in accordance with the purpose of the present invention, according to a different embodiment, a terminal configured to support one or more TTI (transmission time interval) lengths and transmit uplink control information in a wireless communication system includes a transmitter and a receiver, and a processor that controls the transmitter and the receiver. In this case, the processor receives an uplink grant for a plurality of cells, when a transmission timing of an uplink data channel based on the uplink grant is overlapped with a transmission timing of an uplink control channel, transmits uplink control information on an uplink data channel or the uplink control channel of a cell among the plurality of cells based on a relationship between a TTI length of the uplink data channel and a TTI length of the uplink control channel.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to efficiently perform mapping, transmitting, or receiving uplink control information in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
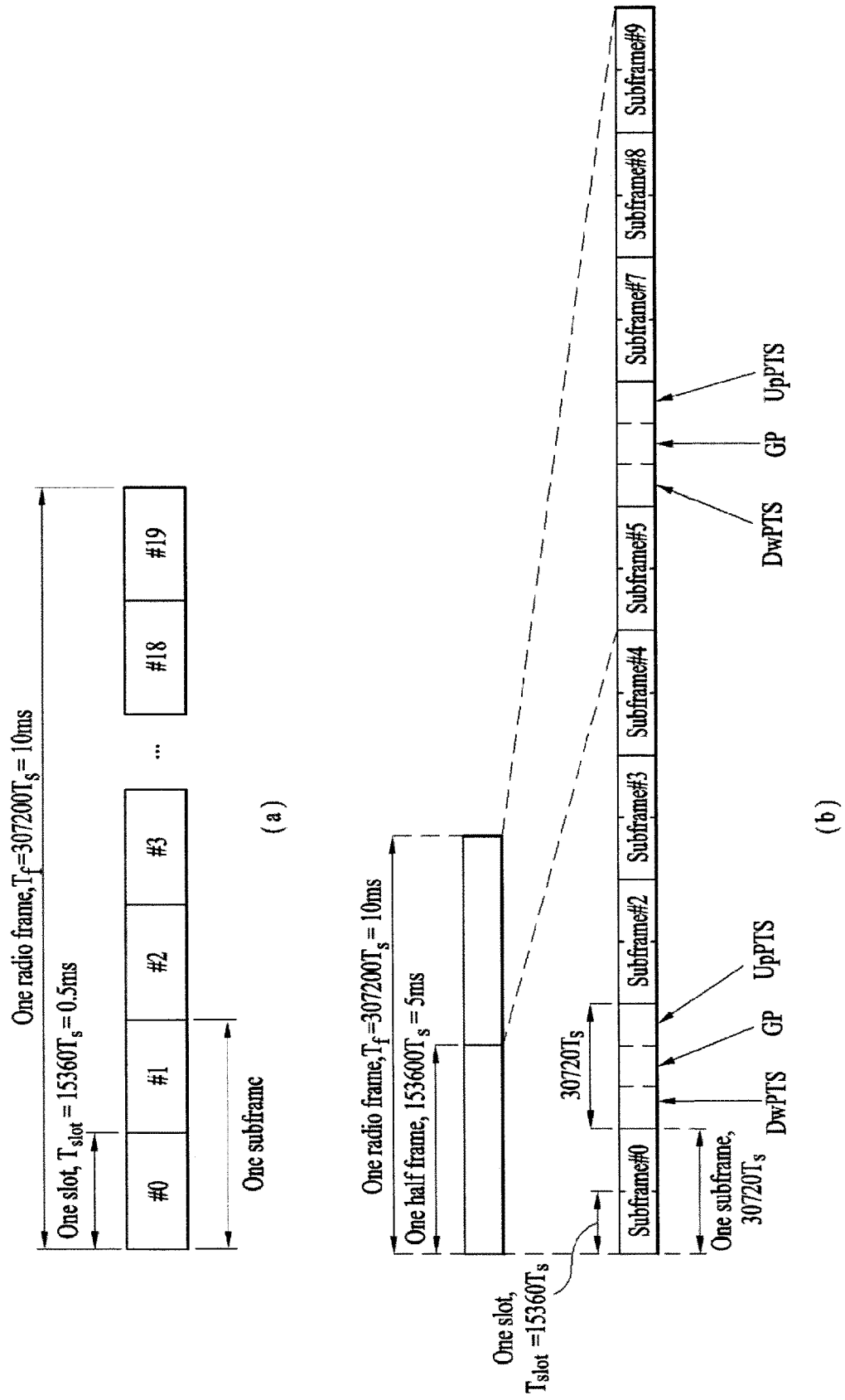
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

Figure 2:
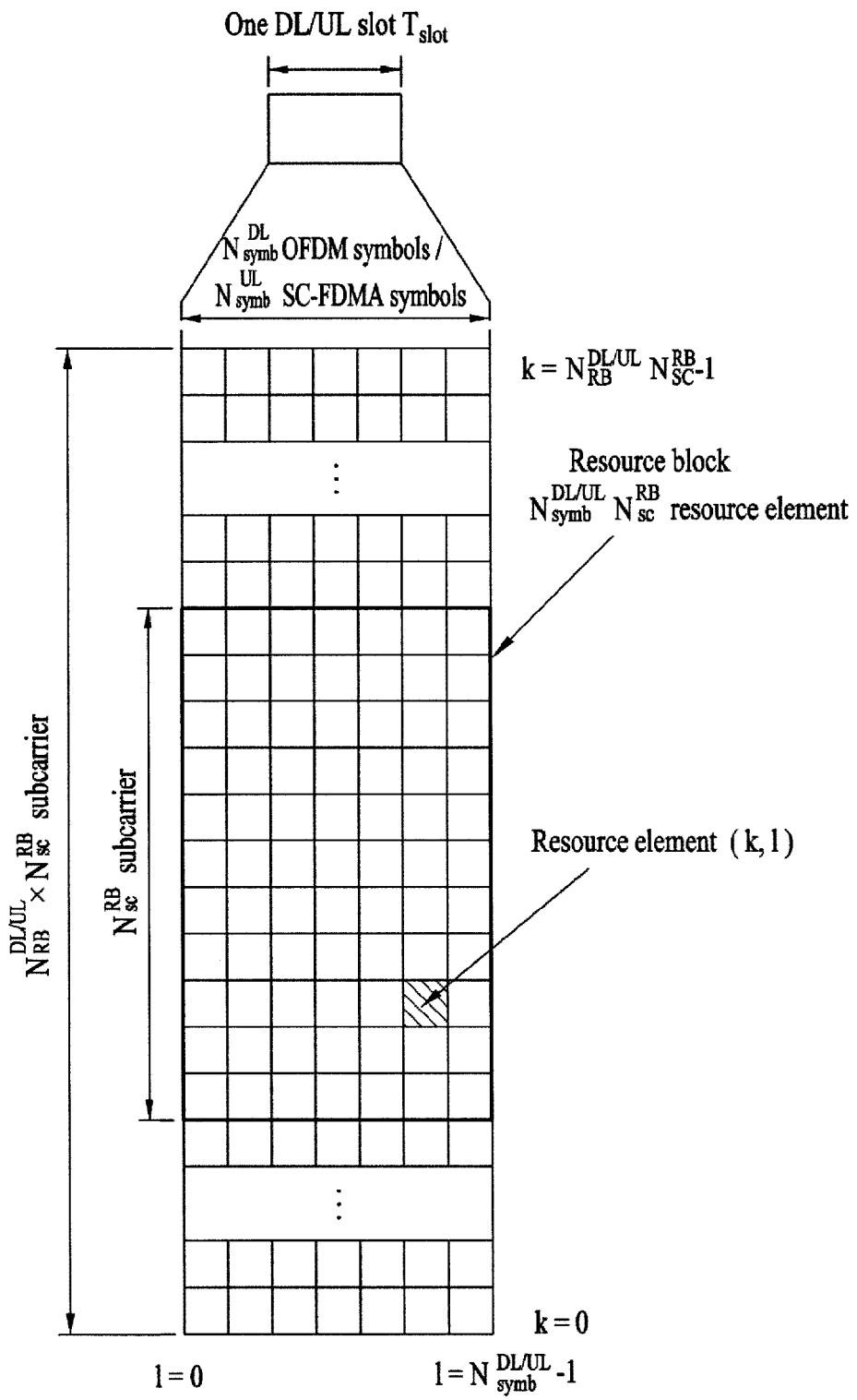
FIG. 2 is a diagram for an example of a downlink (DL)/uplink (UL) slot structure in a wireless communication system.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of

TABLE 2

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | Normal cyclic prefix in uplink | Extended cyclic prefix in uplink | | DwPTS | Normal cyclic prefix in uplink | Extended cyclic prefix in uplink |
| 0 | 6592 · $T_s$  | 2192 · $T_s$ | 2560 · $T_s$ | | 7680 · $T_s$  | 2192 · $T_s$ | 2560 · $T_s$ |
| 1 | 19760 · $T_s$ |              |              | | 20480 · $T_s$ |              |              |
| 2 | 21952 · $T_s$ |              |              | | 23040 · $T_s$ |              |              |
| 3 | 24144 · $T_s$ |              |              | | 25600 · $T_s$ |              |              |
| 4 | 26336 · $T_s$ |              |              | | 7680 · $T_s$  | 4384 · $T_s$ | 5120 · $T_s$ |
| 5 | 6592 · $T_s$  | 4384 · $T_s$ | 5120 · $T_s$ | | 20480 · $T_s$ |              |              |
| 6 | 19760 · $T_s$ |              |              | | 23040 · $T_s$ |              |              |
| 7 | 21952 · $T_s$ |              |              | | 12800 · $T_s$ |              |              |
| 8 | 24144 · $T_s$ |              |              | | —             | —            | —            |
| 9 | 13168 · $T_s$ |              |              | | —             | —            | —            |

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
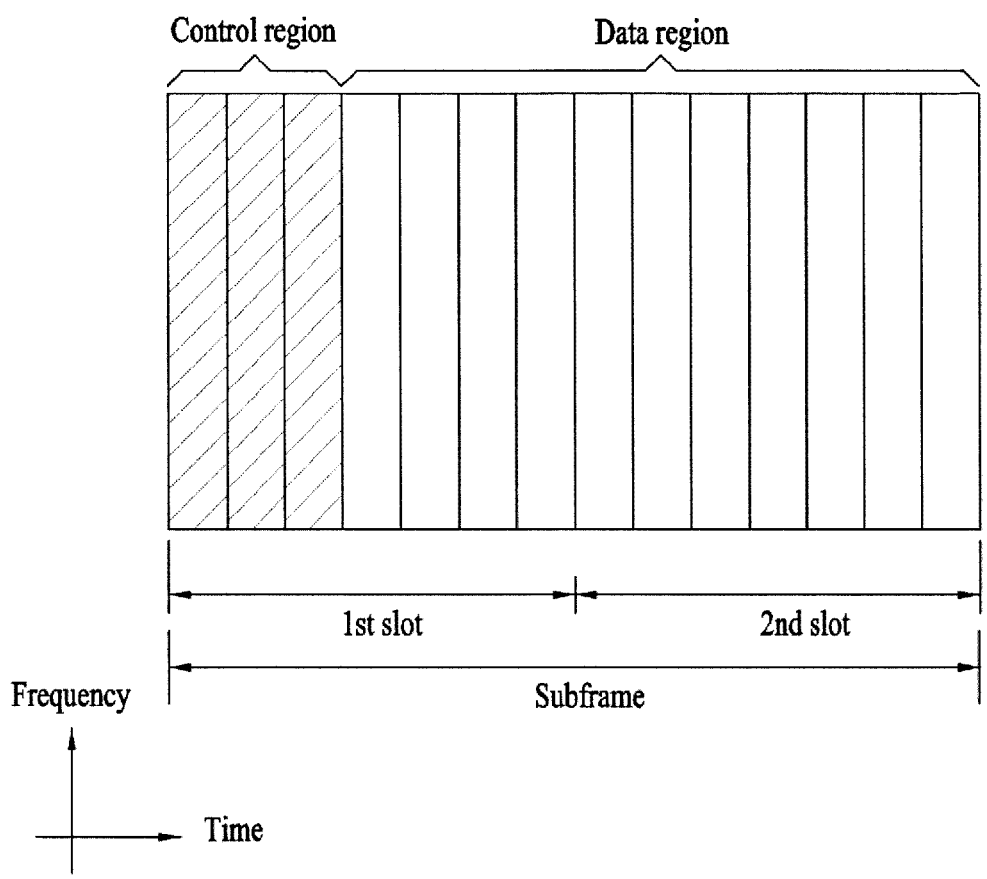
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

Search Space

| Type | Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
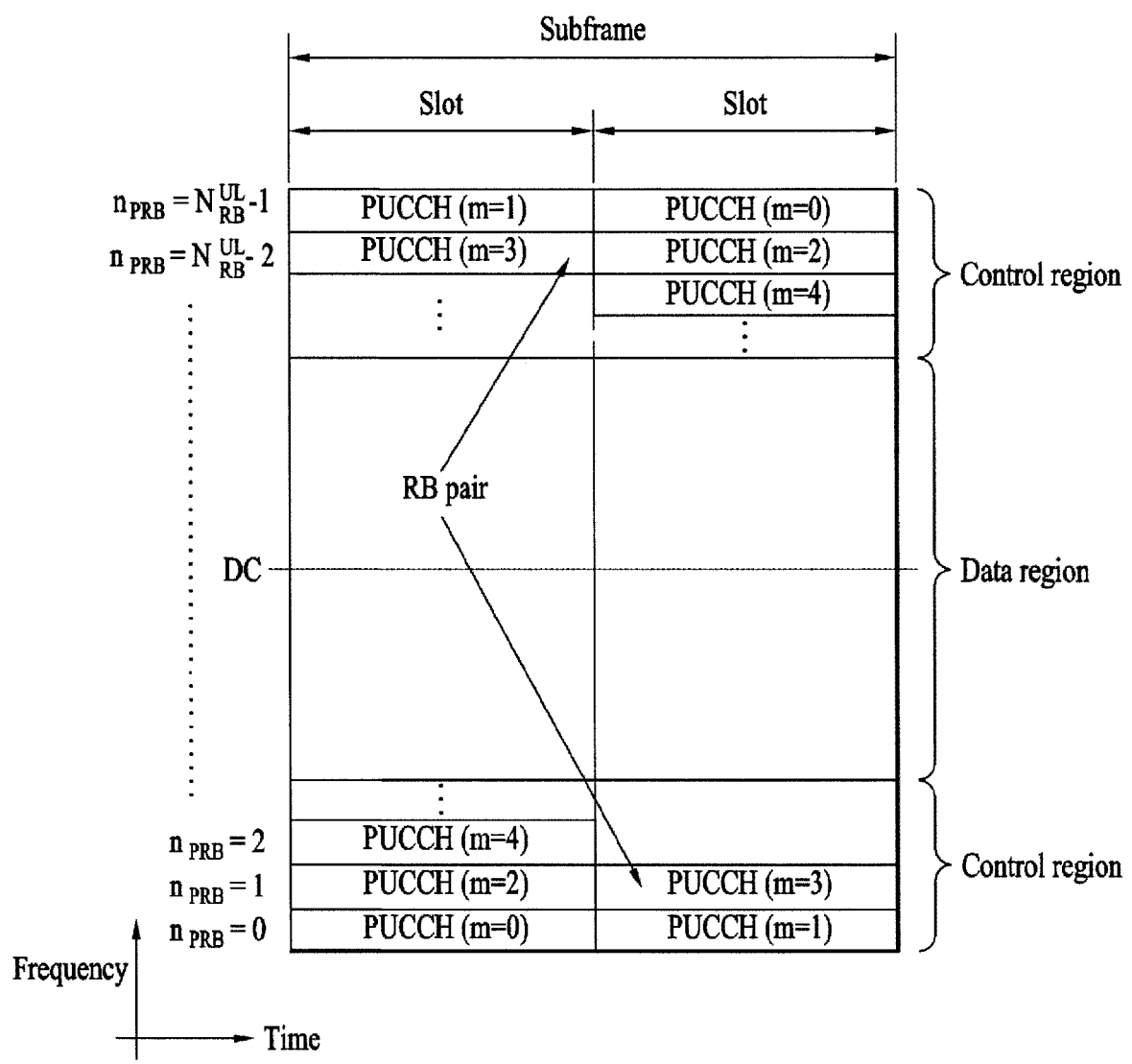
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A(exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

The present invention relates to a method of providing a plurality of different services in a system by applying a different service parameter according to a service or a UE to satisfy a requirement of each of a plurality of the services. In particular, the present invention relates to a method of reducing latency as much as possible by transmitting data as soon as possible during a short time period using a short TTI (transmission time interval) for a service/UE sensitive to latency and transmitting a response within short time in response to the data. On the contrary, it may transmit and receive data using a longer TTI for a service/UE less sensitive to the latency. For a service/UE sensitive to power efficiency rather than the latency, it may repetitively transmit data with the same lower power or transmit data using a lengthened TTI. The present invention proposes a method of transmitting control information and a data signal for enabling the abovementioned operation and a multiplexing method.

For clarity, 1 ms currently used in LTE/LTE-A system is assumed as a basic TTI. A basic system is also based on LTE/LTE-A system. When a different service/UE is provided in a base station of LTE/LTE-A system based on a TTI of 1 ms (i.e., a subframe length), a method of transmitting a data/control channel having a TTI unit shorter than 1 ms is proposed for a service/UE sensitive to latency. In the following, a TTI of 1 ms is referred to as a normal TTI, a TTI of a unit smaller than 1 ms (e.g., 0.5 ms) is referred to as a short TTI, and a TTI of a unit longer than 1 ms (e.g., 2 ms) is referred to as a long TTI.

And, a short TTI can also be represented by the number of symbols. As mentioned in the foregoing description, in LTE/LTE-A system, one slot corresponds to 0.5 ms. In case of using a normal CP, one slot includes 7 symbols. In particular, in case of using a normal CP, a short TTI can include symbols less than 7 symbols. For example, it may be able to configure a short TTI of 2 symbols, a short TTI of 4 symbols, and the like.

Figure 5:
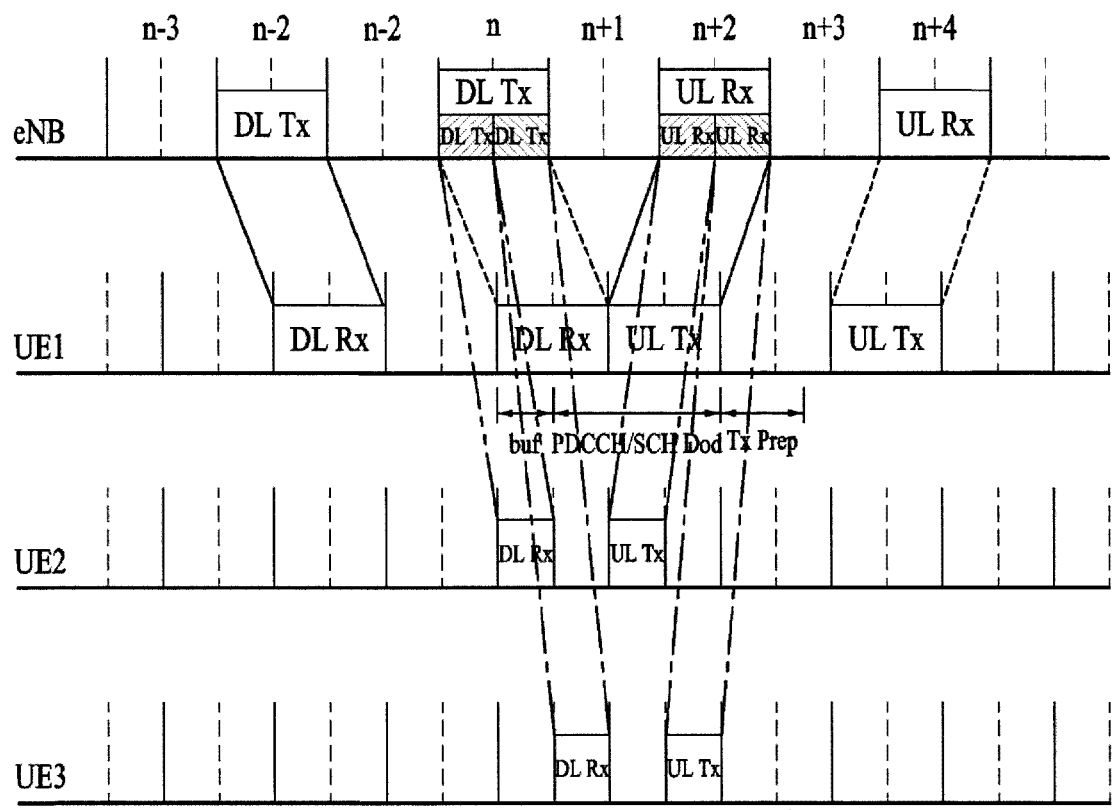
FIG. 5 illustrates DL reception timing and UL transmission timing of user equipments (UEs) operating with a different TTI (transmission time interval)

First of all, a method of supporting a short TTI of a unit shorter than 1 ms in a system basically using a normal TTI of 1 ms unit used in legacy LTE/LTE-A system is described. First of all, downlink (DL) is explained. Multiplexing between channels having a different TTI size in an eNB and an example of uplink (UL) transmission for the multiplexing are shown in FIG. 5. As a TTI is getting shorter, time taken for a UE to buffer and decode a control channel and a data channel is getting shorter. Time taken for performing UL transmission in response to the control channel and the data channel is getting shorter. As shown in the example of FIG. 5, in case of transmission of 1 ms TTI, when a DL channel is transmitted in a specific $n^{th}$ subframe, an eNB can receive a response in an $(n+4)^{th}$ subframe in response to the DL channel. In case of transmission of 0.5 TTI, when a DL channel is transmitted in a specific $n^{th}$ subframe, an eNB can receive a response in an $(n+2)^{th}$ subframe in response to the DL channel. In particular, in order to support TTIs of a different length, it is necessary to support backward compatibility to prevent an impact on a UE operating in a legacy system only for DL and UL multiplexing of channels having a different TTI.

In a next generation system, it may consider a situation that a TTI is variously set to all physical channels or a specific physical channel to satisfy requirements in various application fields. More specifically, in case of 3GPP LTE system, it may be able to configure a TTI corresponding to a unit applied to transmission of a physical channel such as PDSCH/PUSCH/PUCCH to be shorter than 1 msec to reduce latency when communication is performed between an eNB and a UE according to a scenario. And, when a plurality of physical channels exist within a single subframe (e.g., 1 msec) for a single UE or multiple UEs, a TTI can be differently applied to each of a plurality of the physical channels. In the following description of the present invention, for clarity, LTE (LTE-A) system is explained as an example. However, it is apparent that the present invention is applied not only to the LTE (LTE-A) system but also to a communication system to be developed in the future. In this case, a TTI may correspond to 1 msec (i.e., normal TTI) as a normal subframe size in LTE system. A short TTI (i.e., sTTI) corresponds to a value smaller than 1 msec. The sTTI may correspond to a single/multiple OFDM or SC-FDMA symbol unit, by which the present invention may be non-limited. And, a UL data channel and a UL control channel transmitted within the sTTI are referred to as an sPUSCH and an sPUCCH, respectively.

The present invention proposes a method for a terminal to perform UL transmission when a different TTI-length is configured among a plurality of channels (i.e., between PUCCH and PUSCH) in a situation that one or a plurality of TTI lengths (e.g., a TTI length shorter than 1 ms) different from 1 ms TTI of a legacy LTE/LTE-A system are supported. The present invention can also be applied to a UL transmission method of a UE when a different TTI length is configured between cells. Or, it may apply a similar concept to multiplexing between TTI lengths that vary when a system supports one or more subcarrier spacing. For example, when a system supports subcarrier spacing X and subcarrier spacing 2*X, it may be able to apply a concept similar to a case of dividing a subframe into two sTTIs.

For clarity, the present invention is explained based on LTE. However, the contents of the present invention can be applied to a technology using a different waveform/frame structure such as new RAT, and the like.

UCI Transmission Between PUCCH and PUSCH Having Different TTI Length

UE Capability

A UE can report information on whether or not PUCCH and PUSCH having a different TTI length are simultaneously transmitted to a base station.

Or, the UE can report information on whether or not a UL channel having a specific TTI length and the remaining UL channel are simultaneously transmitted to the base station. For example, it may be able to independently configure whether or not PUCCH and PUSCH are simultaneously transmitted based on a TTI length of PUSCH irrespective of a TTI length of PUCCH.

Or, the UE can report simultaneous transmission capability for a combination of UL channels having a specific TTI length to the base station. More specifically, the UE can report simultaneous transmission capability of PUSCH and sPUSCH and/or PUCCH and sPUCCH, and/or sPUSCH and sPUSCH having a different TTI length, and/or sPUCCH and sPUCCH having a different TTI length to the base station.

In this case, PUCCH is configured based on a downlink TTI length and PUSCH can be configured based on an uplink TTI length. When a plurality of downlink CCs (component carriers) are configured by a different TTI length similar to a CA (carrier aggregation) case, PUCCH can be configured based on a Pcell, a master cell, or an sTTI length set to a reference downlink CC.

Method of Transmitting UCI Based on TTI Lengths of PUCCH and PUSCH

A method of transmitting UCI is described for a case that a TTI length of (s)PUCCH and a TTI length of (s)PUSCH are overlapped.

When a TTI length of (s)PUCCH and a TTI length of (s)PUSCH are referred to as N_C and N_S, respectively, and the N_C and the N_S have a different value, a method of transmitting UCI is proposed in the following. A method of transmitting the (s)PUCCH and the (s)PUSCH can be determined by a combination of proposals described in the following.

Proposal 1: It is able to define a rule that UCI is transmitted in a manner of being piggybacked on the (s)PUSCH only when the N_S is equal to or greater than a predetermined value.

Proposal 2: If the N_S is equal to or less than a predetermined value, it is able to define a rule that UCI is transmitted on the (s)PUCCH without being piggybacked.

Proposal 3: It is able to define a rule that whether to perform piggyback is determined in consideration of the number of RBs scheduled with the N_S.

Proposal 3-1: A part of UCI is piggybacked only in consideration of the number of RBs scheduled with the N_S and the remaining UCI is transmitted on the (s)PUCCH. In this case, UCI to be piggybacked can be determined in consideration of a predetermined priority and a UCI payload size.

Proposal 3-2: When simultaneous transmission of (s)PUCCH/(s)PUSCH is unavailable, a part of UCI is piggybacked only and the remaining UCI can be dropped or deferred (in a unit of TTI). Although the simultaneous transmission of (s)PUCCH/(s)PUSCH is available, a part of UCI is piggybacked only and the remaining UCI can be dropped or deferred (in a unit of TTI).

Proposal 4: A method of transmitting UCI can be differently determined based on a relationship between the N_C and the N_S.

Case 1: N_C>N_S

Proposal 4-1: In order to more promptly transmit UCI, when N_C>N_S is satisfied, it is able to define a rule that UCI is transmitted in a manner of being piggybacked on the (s)PUSCH. In this case, if there are multiple cells scheduled with the sPUSCH, the UCI can be piggybacked on a cell having a shortest sPUSCH TTI length among the multiple cells. If the multiple cells scheduled with the sPUSCH have the same sPUSCH TTI length, it is able to define a rule that the UCI is to be piggybacked on a specific cell (e.g., a cell having a lowest cell index) determined by a predetermined rule. Although (s)PUCCH/(s)PUSCH simultaneous transmission is available, it may apply the above-mentioned rules.

Proposal 4-2: It is able to define a rule that UCI is basically transmitted on the (s)PUCCH. In this case, the entire UCI can be piggybacked on sPUSCH of a cell determined by the rule of the proposal 4-1 only when the N_S is equal to or greater than a predetermined value. Or, a part of UCI can be piggybacked only on the sPUSCH of the cell determined by the rule of the proposal 4-1 only when the N_S is equal to or less than the predetermined value. In this case, the UCI to be piggybacked can be determined based on a predetermined priority. In particular, it is able to define a rule that UCI of a higher priority is to be piggybacked. When (s)PUCCH/(s)PUSCH simultaneous transmission is available, the remaining UCI, which is not piggybacked, can be transmitted on the (s)PUCCH or can be dropped. When (s)PUCCH/(s)PUSCH simultaneous transmission is unavailable, the remaining UCI can be dropped.

Proposal 4-3: When the (s)PUCCH/(s)PUSCH simultaneous transmission is unavailable, it is able to define a rule that data is dropped, sPUSCH transmission is deferred (in a unit of a TTI), and UCI is transmitted on the (s)PUCCH only.

Case 2: N_C<=N_S

Proposal 4-4: It is able to define a rule that UCI is basically transmitted on the (s)PUCCH. In this case, the entire UCI can be piggybacked on sPUSCH of a cell determined by the rule of the proposal 4-1 only when the N_C is equal to or less than a predetermined value. Or, a part of UCI can be piggybacked only on the sPUSCH of the cell determined by the rule of the proposal 4-1 only when the N_C is equal to or less than the predetermined value. In this case, the UCI to be piggybacked can be determined based on a predetermined priority. In particular, it is able to define a rule that UCI of a higher priority is to be transmitted on the sPUSCH. When (s)PUCCH/(s)PUSCH simultaneous transmission is available, the remaining UCI, which is not piggybacked, can be transmitted on the (s)PUCCH or can be dropped. When (s)PUCCH/(s)PUSCH simultaneous transmission is unavailable, the remaining UCI can be dropped.

Proposal 4-5: When the (s)PUCCH/(s)PUSCH simultaneous transmission is unavailable, it is able to define a rule that data is dropped, sPUSCH transmission is deferred (in a unit of a TTI), and UCI is transmitted on the (s)PUCCH only. Specifically, it is able to define a rule that a part of UCI is to be transmitted on the sPUCCH only and the remaining UCI is to be dropped. Or, it may be able to define a rule that PUSCH is to be dropped irrespective of whether or not simultaneous transmission is configured and a part of UCI is to be transmitted on the sPUCCH only.

Proposal 5: When (s)PUCCH/(s)PUSCH simultaneous transmission is unavailable irrespective of a TTI length relationship between (s)PUCCH and (s)PUSCH, data can be dropped or (s)PUSCH transmission can be deferred (in a unit of a TTI).

Proposal 6: In the proposals above, it is able to define a rule that piggyback is to be performed only when (s)PUCCH transmission TTI and (s)PUSCH transmission TTI are overlapped and (S)PUSCH is scheduled.

Proposal 7: When a TTI length of PUCCH is different from a TTI length of PUSCH, it may not allow piggyback to be performed.

Method of Transmitting UCI Based on TTI Ending Timings of (s)PUCCH and (s)PUSCH

Proposal 1: When TTI ending timing of (s)PUCCH is identical to TTI ending timing of (s)PUSCH, it is able to define a rule that UCI is to be transmitted on the (s)PUCCH. When (s)PUCCH and (s)PUSCH simultaneous transmission is not available, it is able to define a rule that UCI is to be piggybacked on the (s)PUSCH.

Proposal 2: When TTI ending timing of (s)PUCCH appears after TTI ending timing of (s)PUSCH, it is able to define a rule that UCI is to be piggybacked on the (s)PUSCH.

Figure 6:
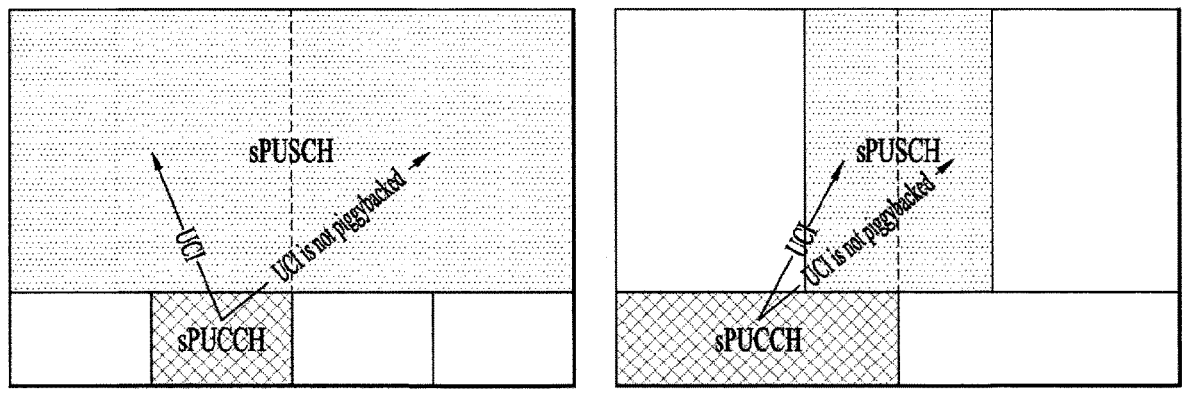
FIG. 6 illustrates a case of processing an overlap of transmission timings of uplink channels having a different TTI length.

Proposal 3: When TTI ending timing of (s)PUCCH appears prior to TTI ending timing of (s)PUSCH, it is able to define a rule that UCI is to be transmitted on the (s)PUCCH. When (s)PUCCH and (s)PUSCH simultaneous transmission is not available, it is able to define a rule that data is dropped, UCI is piggybacked, or UCI transmission is deferred while data is transmitted on the (s)PUSCH and transmission is performed via the (s)PUCCH. In this case, when the UCI is piggybacked, as shown in FIG. 6, it is able to define a rule that UCI is not mapped to a symbol appearing after TTI ending timing of the (s)PUCCH among symbols of the (s)PUSCH.

Proposal 4: In the proposals above, it is able to define a rule that piggyback is to be performed only when (s)PUCCH transmission TTI and (s)PUSCH transmission TTI are overlapped and (S)PUSCH is scheduled.

Drop and Priority Rule

When a combination of multiple channels (e.g., a combination of (s)PUCCH and (s)PUSCH, a combination of (s)PUCCH/(s)PUCCH, a combination of (s)PUSCH/(s)PUSCH, a combination of PUSCH/SRS, a combination of PUCCH/SRS, and/or a combination of three or more channels) is overlapped in time, it may apply a priority rule described in the following.

Proposal 1: It is able to define a rule that a legacy PUSCH/PUCCH has a higher priority compared to sPUSCH/sPUCCH. For example, when it is necessary to simultaneously transmit UL channels more than multi-cluster capability of a UE, sTTI UL channel can be preferentially dropped among a legacy UL channel and the sTTI UL channel. On the contrary, when low latency is a more important factor, it is able to define a rule that sPUSCH/sPUCCH has a higher priority compared to a legacy PUSCH/PUCCH.

Proposal 1-1: It is able to define a rule that a shorter TTI length has a higher priority. Or, in order to avoid complexity of power allocation, it is able to define a rule that a longer TTI length has a higher priority.

Proposal 2: When UCI piggyback is performed due to simultaneous transmission capability of a UE, it is able to define a rule that piggybacked sPUSCH has a higher priority compared to PUSCH including UL data only.

Figure 7:
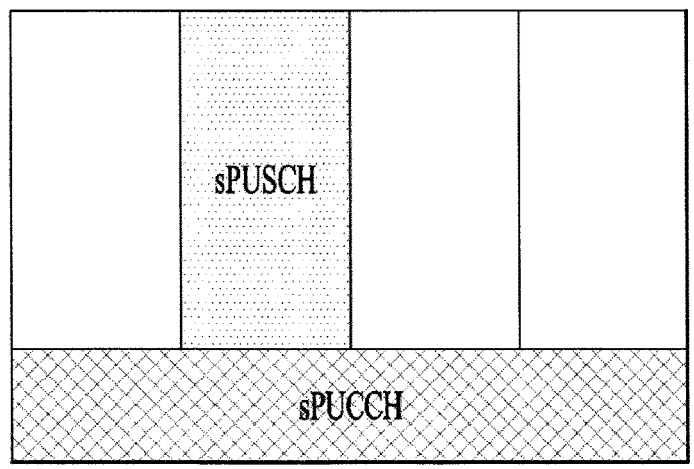
FIG. 7 illustrates a case that a TTI of a relatively short length is included in a TTI of a relatively long length.

Power Control for UL Channels Having a Different TTI Length and/or UL Carriers Having a Different TTI Length Power Control when a TTI Length of (s)PUCCH is Different from a TTI Length of (s)PUSCH Proposal 1: Power is preferentially allocated to (s)PUCCH or sTTI UL carrier (or a TTI length of a higher priority) and the remaining power can be allocated to (s)PUSCH or a longer TTI UL carrier(s) (or a TTI length(s) of a lower priority). More specifically, as shown in FIG. 7, when a TTI of sPUSCH is included in a TTI of (s)PUCCH, the rule above can be applied.

Proposal 1-1: As a different method, in order to guarantee that sPUSCH or a UL carrier of a longer TTI length has power equal to or greater than a predetermined level, it is able to introduce guaranteed power. More specifically, it is able to allocate minimum/maximum power to the sPUSCH or the UL carrier of a longer TTI length via higher layer signaling. When power is allocated to (s)PUCCH or a UL carrier(s) of a shorter TTI length, the remaining power except the maximum/minimum power, which is allocated to the sPUSCH or the UL carrier of the longer TTI length, can be allocated to the (s)PUCCH or the UL carrier(s) of a shorter TTI length. Subsequently, power allocation can be performed on the sPUSCH or the UL carrier of the longer TTI length. When the power allocated to the sPUSCH or the UL carrier of the longer TTI length is less than the guaranteed power, power allocation can be performed as much as the allocated power. When the power allocated to the sPUSCH or the UL carrier of the longer TTI length is greater than the guaranteed power, it may be able to use power remained after power is allocated to the sPUCCH or the carrier(s) of the shorter TTI length in addition to the guaranteed power. Additionally, the guaranteed power can be configured in advance by a higher layer based on a TTI length or a TTI length group.

Proposal 2: When a TTI of sPUSCH includes a TTI of sPUCCH, when a part of a TTI of sPUSCH is overlapped with a TTI of sPUCCH, or when UL CCs having a different TTI length are partly or completely overlapped When a TTI of sPUSCH is overlapped only, a legacy power control method is conservatively reused. In this case, although the sPUCCH is not actually transmitted, since sPUSCH is transmitted using the remaining power except power as much as power of the sPUCCH, a power-limited condition less than necessity is limited. When TTI lengths different from each other are partly overlapped, power is configured in accordance with the maximum TTI length (the maximum TTI length available between channels, 1 ms subframe, or a system) and power of each channel can be constantly maintained irrespective of whether TTI lengths are overlapped or not. According to the method above, since power is constantly maintained for a single channel or a UL carrier having a TTI, or irrespective of the number of TTIs, there may exist a limit on power. In order to more efficiently perform the method, it is preferable to transmit the same power when TTIs are partly overlapped as well.

Figure 8:
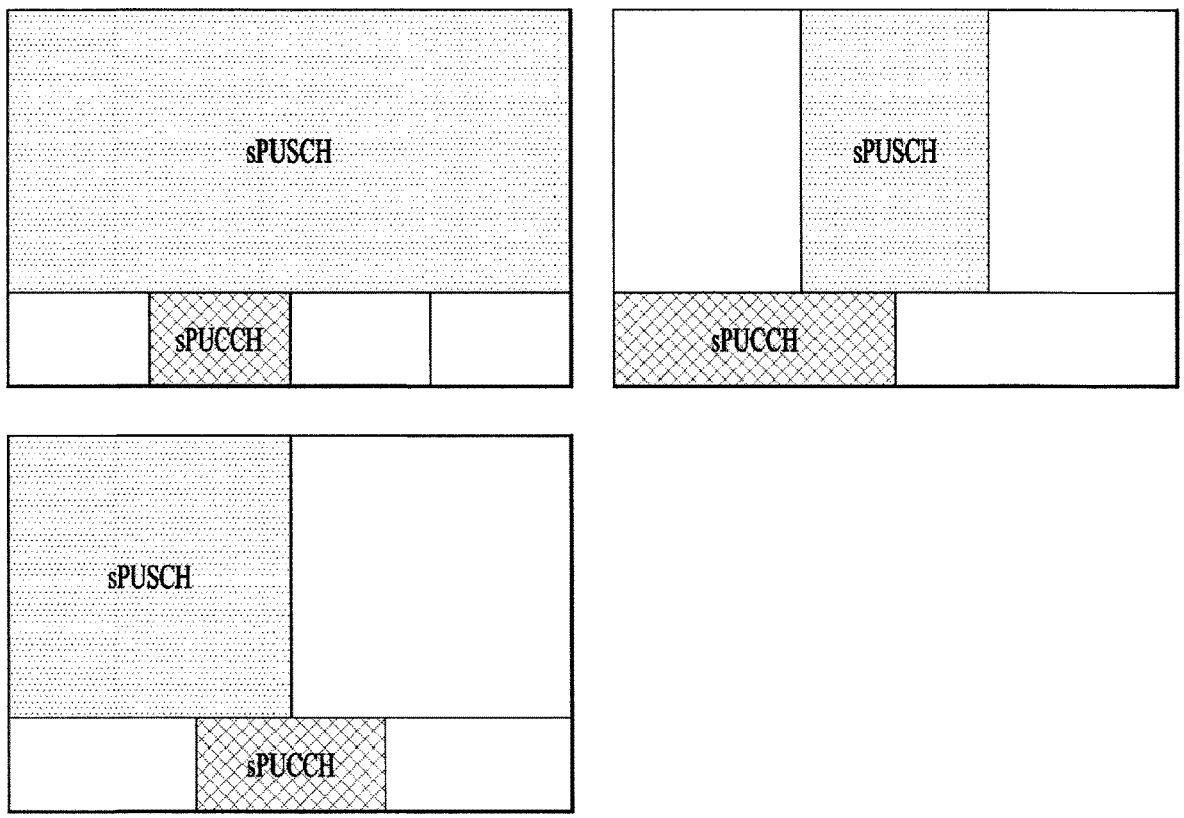
FIG. 8 illustrates a relationship between TTIs having a different length.

In particular, when a channel is transmitted, the remaining power can be additionally used for the channel. For example, in the top left drawing of FIG. 8, assume that transmit power of sPUSCH corresponds to A and transmit power of sPUCCH corresponds to B. In this case, when the sPUSCH is transmitted only, a UE transmits the sPUSCH using transmit power A+B. When the sPUSCH and the sPUCCH are transmitted, the UE transmits the sPUSCH and the sPUCCH using the transmit power A and the transmit power B, respectively. When the sPUSCH is transmitted only, the UE can transmit the sPUSCH using the transmit power A+B. Otherwise, a power transition period of the UE may occur whenever transmit power changes. In particular, although UL of a plurality of CCs are aggregated, it may consider a case that the CCs operate with a single TTI length.

In particular, it is able to define a rule that power of a time period corresponding to a symbol in which a TTI of sPUSCH and a TTI of sPUCCH are overlapped is configured to be different from power of a time period corresponding to a symbol in which overlapped does not occur. Or, it is able to define a rule that power control of sPUSCH is to be differently configured in a symbol unit.

For example, when a TTI of sPUSCH is overlapped with a TTI of sPUCCH in a symbol, power control can be performed based on an equation described in the following.

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TP,c}(i) + f_c(i) \end{Bmatrix}$$ [Equation 1]

When a TTI of sPUSCH is not overlapped with a TTI of sPUCCH in a symbol, power control can be performed based on an equation described in the following.

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TP,c}(i) + f_c(i) \end{Bmatrix}$$ [Equation 2]

The method above can be extensively applied not only to a case that a TTI of sPUSCH includes a TTI of sPUCCH or a case that the TTI of the sPUSCH is partly overlapped with the TTI of the sPUCCH, but also to a different case.

Whether to apply power control based on time duration or a symbol can be set to a UE via higher layer signaling or physical layer signaling.

Proposal 3: As a different method, it may be able to apply a power allocation method in consideration of power guaranteed in a form similar to the proposal 1-1.

More specifically, the guaranteed power can be respectively set to sPUCCH and sPUSCH. More specifically, it is able to allocate the guaranteed power to each of the channels based on a TTI length or a TTI length group. In more detail, power of a specific channel (hereinafter, channel 1) is allocated to the remaining power except a power value guaranteed to a different channel (hereinafter, channel 2). Subsequently, transmit power of the channel 2 is allocated to the remaining power (ranging from minimum guaranteed power based on power allocation of the channel 1 to {maximum transmit power of UE−transmit power allocated to the channel 1}). When transmission look ahead is available for the channel 2 (a channel having transmission starting timing later than transmission starting timing of the channel 1), actual transmit power of the channel 2 is calculated and transmit power of the channel 1 can be allocated by power ranging from "minimum {UE maximum transmit power−guaranteed power of the channel 2} to maximum {UE maximum transmit power−transmit power allocated to the channel 2} based on power allocation of the channel 2. In this case, the UE maximum transmit power may correspond to Pcmax,c corresponding to the maximum permitted power for a specific cell c. More specifically, the channel 1 and the channel 2 can be selected by one of methods described in the following.

Sub-proposal 1: The channel 1 and the channel 2 may correspond to sPUCCH and sPUSCH, respectively, or vice versa.

Sub-proposal 2: The channel 1 may correspond to a channel having earlier transmission timing and the channel 2 may correspond to a channel having later transmission timing among sPUCCH and sPUSCH.

Sub-proposal 3: The channel 1 may correspond to a channel having a short TTI length and the channel 2 may correspond to a channel having a long TTI length, or vice versa.

Sub-proposal 4: The channel 1 may correspond to a channel of which importance of a UCI type or a priority is higher. The channel 2 may correspond to a channel of which importance of a UCI type or a priority is lower.

Sub-proposal 5: The channel 1 and the channel 2 can be configured by a combination of the methods above based on a starting timing difference between the two channels. For example, if the starting timing difference between the two channels is equal to or less than a threshold value configured in advance or a threshold value configured via higher layer signaling (i.e., when transmission look ahead of a following channel is available), the proposal 1, the sub-proposal 1, the sub-proposal 3, or the sub-proposal 4 is performed. Otherwise, the sub-proposal 3 can be performed. As a different example, if a TTI length difference between the two channels is equal to or less than a threshold value configured in advance or a threshold value configured via higher layer signaling (i.e., when transmission look ahead of a following channel is available), the proposal 1, the sub-proposal 1, the sub-proposal 3, or the sub-proposal 4 is performed. Otherwise, the sub-proposal 3 can be performed.

The method above can be utilized/applied not only to a power allocation method but also to a case that a transmission of a specific channel is dropped or terminated.

Proposal 4: When two or more transmission timings for combinations of multiple UL channels are overlapped in time, it may be able to apply a power allocation method for configuring guaranteed power to a specific combination of UL channels. In this case, a channel combination may include a plurality of channels. More specifically, power of a specific channel combination (hereinafter, channel combination 1) is allocated to the remaining power except a power value guaranteed for a different channel combination (hereinafter, channel combination 2). Subsequently, it is able to allocate power for the channel combination 2 to the remaining power (power ranging from minimum guaranteed power to UE maximum transmit power).

Sub-proposal 1: The channel combination 1 may correspond to aPUCCH and/or PUCCH and the channel combination 2 may correspond to sPUSCH and/or PUSCH.

Sub-proposal 2: The channel combination 1 may correspond to aPUCCH and/or PUCCH and the channel combination 2 may correspond to sPUSCH and/or PUSCH.

Sub-proposal 3: The channel combination 1 corresponds to partial channels from a channel having the shortest TTI length in an ascending order among the entire channels and the channel combination 2 may correspond to the remaining channels.

The multiple channels can be transmitted in the same cell or can be individually transmitted in a plurality of cells. Although the present embodiment explains simultaneous transmission of PUCCH and PUSCH, the embodiment can also be applied to a different combination (e.g., PUCCH/PUCCH, PUSCH/PUSCH, PUSCH/SRS, PUCCH/SRS, and/or a combination of three or more channels). The transmission of the multiple channels can also be applied to a case of different subcarrier spacing.

Power Control when Transmission Timings of a Plurality of Channel Combinations are Overlapped When transmission timings of a plurality of channel combinations (e.g., (s)PUCCH & (s)PUSCH, (s)PUCCH/(s)PUCCH, (s)PUSCH/(s)PUSCH, PUSCH/SRS, PUCCH/SRS, and/or a combination of three or more channels) are overlapped in time, UL power control described in the following is proposed.

Proposal 1: When UL channels are overlapped, transmit power of a UL channel (e.g., a legacy UL channel) having a long TTI length or a specific TTI length is consistently maintained within a TTI.

Proposal 2: When UL channels are overlapped, it is able to define a rule that transmit power of a UL channel (e.g., a legacy UL channel) having a long TTI length or a specific TTI length is to be changed in a unit of a (predetermined or signaled) time period. More specifically, when transmit power of a UL channel is changed in a unit of a time period, the UL channel can be restricted to a UL channel having a legacy TTI length or a UL channel having a long TTI length among overlapped UL channels. A time period during which the transmit power is maintained without being changed can be configured by a network or capability of a UE. The UE can report information (e.g., minimum time period) on the time period during which the transmit power is maintained without being changed to a network.

Proposal 3: When a UE transmits a plurality of UL channels and transmission timings of the UL channels are overlapped, assume that a UL channel having relatively earlier transmission starting timing corresponds to a channel 1 and a UL channel having relatively later transmission starting timing corresponds to a channel 2. Assume that transmit power is set to each of the overlapped UL channels. In this case, the total transmit power of the UE can be considerably changed when the channel 2 starts. In LTE standard, a specific time period capable of changing transmit power of a UE is defined as a transient period and a transmit power requirement of a UE is not applied during the transient period. If the transient period is overlapped with a DMRS transmission period of the channel 1, it is able to define a rule that the channel 2 is to be dropped or transmission starting timing of the channel 2 is to be deferred (as much as predetermined time or signaled time). Or, it is able to define a rule that transmission of the channel 1 is terminated by a predetermined priority and the channel 2 is to be transmitted.

PHR (Power Head Room) Report

In general, a UE calculates PHR for each of configured cells in LTE system and reports the calculated PHR to a base station via MAC (medium access control) signaling or RRC signaling. The PHR reporting can be periodically performed or can be performed when a specific event is satisfied. In this case, basically, a PHR value for a random cell transmitted in a random subframe corresponds to a difference value between Pcmax,c corresponding to the maximum permitted power for a cell c calculated in the subframe and transmit power of a signal transmitted by a UE in the subframe via the cell. Or, when a signal is not transmitted via a random cell in a random subframe, a PHR value for the random cell transmitted in the random subframe may become a difference value with virtually calculated transmit power. In this case, Pcmax,c in the random subframe is calculated by a parameter of maximum power capable of being transmitted in a corresponding cell in a condition that a UE satisfies limited requirement for a transmission spectrum in consideration of transmission in the cell or other cells in the subframe.

When a rule is defined to change power within a TTI for a specific UL channel, it is able to define a rule that a UE calculates or reports a separate PHR in a unit of a time period during which the power changes.

Or, it may consider additionally configuring a reference TTI length for transmitting PHR. In this case, it is able to transmit one PHR. Although there are multiple UL CCs, it may assume that a reference TTI length is configured by one.

UL Power Control when Transmission Timings of Multiple Channels Having Different Subcarrier Spacing are Overlapped When transmission timings of multiple channels having different subcarrier spacing are overlapped in time, UL power control described in the following is proposed.

Proposal 1: When UL channels are overlapped, power of a UL channel having small subcarrier spacing or power of a UL channel having specific subcarrier spacing (e.g., subcarrier spacing predetermined/configured as default, 15 kHz or a different value) is consistently maintained within a TTI.

Proposal 2: When UL channels are overlapped, it is able to define a rule that (predetermined or signaled) transmit power of a UL channel having small subcarrier spacing or transmit power of a UL channel having specific subcarrier spacing is to be changed in a unit of a time period. More specifically, when power of a UL channel is changed in a unit of a time period, the UL channel can be restricted to a UL channel having small subcarrier spacing or a UL channel having specific subcarrier spacing (e.g., subcarrier spacing predetermined/configured as default, 15 kHz or a different value). A time period during which the transmit power is maintained without being changed can be configured by a network or capability of a UE. The UE can report capability related to information (e.g., minimum time period) on the time period during which the transmit power is maintained without being changed to a network. Or, a time period can be divided into a time period overlapped with a different channel and a time period not overlapped with a different channel and it is able to define a rule that power of a UL channel is to be consistently maintained in each of the time periods.

When transmit power is determined, it may be able to configure power to be increased based on (subcarrier spacing within an allocated RB*number of subcarriers) rather than the number of allocated RBs. To this end, a parameter can be configured based on transmit power per subcarrier or reference numerology. In this case, the meaning of the numerology is to determine a TTI length, subcarrier spacing, and the like to be applied to a wireless communication system.

In accordance with the change of subcarrier spacing, a length of a subframe may change. Moreover, downlink subcarrier spacing may be different from uplink subcarrier spacing. Since transmission timing is determined based on DL/UL subcarrier spacing and a TTI, time taken until transmit power is allocated (PUCCH or PUSCH transmission) may vary. Transmission of a channel having a shorter TTI length may start in the middle of transmitting a channel having a longer TTI length. When transmit power of the channel having the shorter TTI length is determined, it is difficult to consider transmit power of the channel having the longer TTI length. Hence, if it is necessary for the channel having the shorter TTI length to occupy transmit power, it may temporarily perform puncturing on a symbol of a longer TTI length, lower transmit power, or reserve power guaranteed for a shorter TTI.

When a UL channel having a short TTI is transmitted (e.g., transmission of 1 or 2 OFDM symbols), if a power transient period is assumed in a manner of being similar to a current PUSCH or PUCCH, an impact due to the power transient period increases. Hence, similar to transmission of an SRS, it may assume that the transient period is located at the outside of a transmission symbol. Since the transient period impacts on a legacy transmission of a longer TTI, if the impact is collided with such a channel of which reliability is important as a DMRS, an SRS, and the like, a UE may drop the entire transmission. Or, if transmission is performed while transmit power is maintained, it may be able to prevent the transient period. This means that power transmitted on a channel is reduced in the middle of transmission. In this case, assume that the entire power is maintained. For example, when PUSCH having a long TTI is transmitted, a network can configure high transmit power in consideration of transmission of PUCCH/PUSCH having a short TTI. The transmit power can be maintained during the entire time for which two channels are transmitted. If UL transmission having a longer TTI length is overlapped with one or more UL transmissions having a short TTI length, power is configured in accordance with the maximum power and a UE can maintain the power irrespective of the number of transmitted channels. This may correspond to a case that a UE shares a single amplifier. Otherwise, the UE may not be restricted by the constraint above.

The constraint can be more useful when overhead of a transient period is relatively big due to the use of big subcarrier spacing. When channels having different transmit power are continuously transmitted, strongest power can be maintained and transmitted. In particular, when channels are continuously transmitted (while being overlapped or not overlapped), in order to reduce a transmit power change between the channels, for example, uplink power transmitted in a subframe can be consistently maintained. In particular, it is able to define a rule to make transmit power not to be changed when a UE continuously transmits the channels. In some cases, transmit power of a UE may be greater or less than configured transmit power. The transient period can be assumed at a GP (guard period) or a subframe boundary. Or, if subcarrier spacing is wide, it may assume that a first OFDM symbol, at least one or more OFDM symbols, or several OFDM symbols are used as a power transient period (except contiguous UL transmission), if necessary. In this case, it may perform puncturing on several symbols. To this end, it may also consider a GP when switching is performed from DL to UL.

It is able to define a rule that a UE calculates/reports separate PHR based on subcarrier spacing (or numerology). Or, it may consider additionally configuring reference subcarrier spacing for transmitting PHR. In this case, it is able to transmit one PHR. Although there are multiple UL CCs, it may assume that reference subcarrier spacing is configured by one.

UL Power Control Processing 1 when Transmission Timings of Multiple Channels Having Different Numerology are Overlapped Assume a case that transmission timings of multiple UL channels having a different numerology (e.g., TTI length, subcarrier spacing, etc.) are overlapped in time. For example, assume a case that transmission timings of a UL channel having a longer TTI length and a UL channel having a shorter TTI length are overlapped. Since transmission timing of each channel is determined based on DL/UL subcarrier spacing and a TTI, time taken until transmit power is allocated (PUCCH or PUSCH transmission) may vary. And, transmission of a channel having a shorter TTI length may start in the middle of transmitting a channel having a longer TTI length. In this case, when transmit power of the channel having the longer TTI length is determined, it is difficult to consider transmit power of the channel having the shorter TTI length. Hence, (1) it may stop the transmission of the longer TTI, or (2) it may perform puncturing on symbols overlapped with the shorter TTI or reduce power. In the former case, since it is necessary to always drop the UL channel having the longer TTI length, latency of the UL channel having the longer TTI length can be more increased. On the other hand, in the latter case, as the number of symbols overlapped with the shorter TTI length increases, reliability of the punctured/power-reduced UL channel having the longer TTI length can be deteriorated.

In particular, when transmission timings of multiple UL channels having a different numerology (e.g., TTI length, subcarrier spacing, etc.) are overlapped in time, it is able to define a rule that transmission of a UL channel having a specific numerology (e.g., a UL channel having a longer TTI length) is terminated or dropped only when an overlapped time period is equal to or greater than a predetermined value. Or, when transmission timings of multiple UL channels having a different numerology (e.g., TTI length, subcarrier spacing, etc.) are overlapped in time, it is able to define a rule that puncturing or power reduction is to be applied to an overlapped symbol of a transmission of a UL channel having a specific numerology (e.g., a UL channel having a longer TTI length) only when an overlapped time period is equal to or less than a predetermined value. As a further different method, when transmission timings of multiple UL channels having a different numerology (e.g., TTI length, subcarrier spacing, etc.) are overlapped in time, it may be able to semi-statically or dynamically indicate a UE that whether transmission of a UL channel having a specific numerology (e.g., a UL channel having a longer TTI length) is to be terminated or dropped or whether or not puncturing/power reduction is to be performed. Although the present proposal explains a case that transmission timings of multiple UL channels are overlapped, the abovementioned rule(s) can be identically/similarly applied to a case that transmission timings of multiple DL channels are overlapped or a case that transmission timing of a DL channel is overlapped with transmission timing of a UL channel.

UL Power Control Processing 2 when Transmission Timings of Multiple Channels Having Different Numerology are Overlapped When transmission timings of multiple UL channels having a different numerology (e.g., TTI length, subcarrier spacing, etc.) are overlapped in time, it is able to define a rule that a part of transmission of a UL channel having a specific numerology (e.g., a UL channel having a longer TTI length) is to be dropped only. In particular, it may be able to include an operation of dividing the UL channel having the specific numerology (e.g., a UL channel having a longer TTI length) by a predetermined specific unit (e.g., slot), dropping a unit part overlapped with a different channel, and transmitting the remaining unit only. Or, information of a part to be dropped and a part to be transmitted can be transmitted to a UE via higher layer/physical layer signaling.

As a specific example, when transmission timing of PUSCH having a legacy TTI length is overlapped with transmission timing of sPUSCH having an sTTI length in a first slot, it is able to define a rule that a part corresponding to the first slot of the PUSCH is to be dropped only and the second slot is to be transmitted. As mentioned in the foregoing description, when a part of the PUSCH is transmitted, since it is able to improve reliability and reduce a retransmission probability compared to an operation of dropping the entire PUSCH, it may have a merit in terms of latency.

Or, when transmission timings of multiple UL channels having a different numerology (e.g., TTI length, subcarrier spacing, etc.) are overlapped in time, whether to drop/terminate the entire transmission of a UL channel having a specific numerology (e.g., a UL channel having a longer TTI length) or a part of the transmission can be configured to a UE.

UCI-TTI Mapping when Transmission Timings of Multiple Channels Having Different Numerology are Overlapped When transmission timings of multiple UL channels having a different numerology (e.g., TTI length, subcarrier spacing, etc.) are overlapped in time, if a rule is defined to piggyback UCI on a UL channel having a specific numerology (e.g., a UL channel having a longer TTI length), it is able to define a rule that the UCI is to be mapped during a TTI corresponding to the timing of a UL channel to be originally transmitted or during a TTI appearing after the TTI.

Or, when UCI is mapped to a UL channel having a specific numerology (e.g., a UL channel having a longer TTI length), it is able to define a rule that the UL channel is divided by a predetermined specific time unit (e.g., slot) and the UCI is to be mapped to an overlapped time unit only.

UCI Transmission for Different TTI Length, Numerology, and Processing Time

Stacking Order of UCI

When HARQ-ACKs are transmitted in response to DL data channels having a different numerology and/or a TTI length and/or processing time, if transmission timings of the HARQ-ACKs are overlapped in time and the HARQ-ACKs are intended to be transmitted on a single UL channel, it is necessary to define a stacking order of the HARQ-ACKs to guarantee reliability of UCI. In the following, a specific example of the stacking order of the HARQ-ACK in the situation above is described.

Proposal 1: It is able to define a rule that UCI on a DL allocation channel or a DL data channel having a specific numerology and/or a TTI length and/or processing time is to be preferentially stacked.

Proposal 2: It is able to define a rule that UCI, which is supposed to be transmitted to a UL channel having a specific numerology and/or a TTI length and/or processing time when transmission timings of HARQ-ACKs are not overlapped, is to be preferentially stacked.

Proposal 3: A stacking priority can be determined by a transmission timing of DL data. More specifically, when a priority is placed on starting timing and/or ending timing of DL data transmission, it is able to define a rule that UCI on the starting timing and/or the ending timing is to be preferentially stacked.

Proposal 4: When a priority is placed on starting timing and/or ending timing of a DL allocation channel scheduling DL data (e.g., (s)PDCCH), it is able to define a rule that DCI on the starting timing and/or the ending timing is to be preferentially stacked.

Proposal 5: A UCI stacking order can be defined in an ascending order (or a descending order) of HARQ process IDs related to DL data.

Proposal 6: A UCI stacking order can be defined in an ascending order (or a descending order) of DAIs (DL assignment indexes) related to DL data.

A stacking order of UCI can be determined by a combination of (all or) a part of the proposals.

UCI Mapping for Different TTI Length/Numerology/and Processing Time

When HARQ-ACKs are transmitted in response to DL data channels having a different numerology and/or a TTI length and/or processing time, if transmission timings of the HARQ-ACKs are overlapped in time and the HARQ-ACKs are intended to be piggybacked on (s)PUSCH, it is able to define a rule that HARQ-ACK bit is to be mapped to an RE resource of a different position based on a different numerology and/or TTI length and/or processing time. As a specific example, it is able to define a rule that UCI is to be piggybacked to a different PRB based on a different numerology and/or TTI length and/or processing time. Or, it is able to define a rule that UCI is to be piggybacked to a specific symbol, which is defined in advance or signaled via higher layer/physical layer signaling, based on a different numerology and/or TTI length and/or processing time.

Condition of UCI Transmission

When transmission timings of multiple UL channels having a different numerology and/or TTI length and/or processing time are overlapped in time, all or a part of a channel (channel 1) having a specific numerology and/or TTI length and/or processing time is dropped/terminated and the remaining channel (channel 2) can be transmitted only. For example, the abovementioned case may include a case that the channel 1 corresponds to 1 ms TTI PUSCH and the channel 2 corresponds to sPUSCH having a shorter TTI length. In this case, a UCI transmission operation can be differently defined in consideration of the items described in the following.

Proposal 1: Whether to transmit UCI of the channel 1 included in the channel 2 can be determined based on a numerology and/or TTI length and/or processing time of the channel 2. Or, a UCI type to be transmitted in a manner of being included in the channel 2 can be determined based on a numerology and/or TTI length and/or processing time of the channel 2. For example, when a TTI length of the channel 1 corresponds to 1 ms TTI and a TTI length of the channel 2 corresponds to 2 symbols, CSI is dropped without being transmitted. If the TTI length of the channel 2 corresponds to 4/7 symbols, CSI can be transmitted in a manner of being include in the channel 2.

Proposal 2: Whether to transmit UCI of the channel 1 included in the channel 2 can be determined based on a UCI payload size of the channel 1. Or, when the channel 2 corresponds to (s)PUSCH, whether to transmit UCI of the channel 1 included in the channel 2 can be determined by frequency resource allocation.

Proposal 3: Whether to transmit UCI of the channel 1 included in the channel 2 can be determined based on a UCI type of the channel 1. For example, when UCI of the channel 1 corresponds to HARQ-ACK, the UCI of the channel 1 is transmitted in a manner of being included in the channel 2. When the UCI of the channel 1 corresponds to CSI, the UCI of the channel 1 can be dropped without being transmitted.

Proposal 4: Whether to transmit UCI of the channel 1 included in the channel 2 can be determined based on a power allocation situation of a UE. Or, a UCI type of the channel 1, which is allowed to be transmitted together with the channel 2, can be differently determined based on a power allocation situation of a UE. For example, if a limit is set on power, UCI of the channel 1 is dropped. If there is no limit on power, UCI of all or a part of the channel 1 can be transmitted in a manner of being included in the channel 2.

When UCI of the channel 1 is transmitted in a manner of being piggybacked on the channel 2 by a combination of (all or) a part of the proposals, it may be able to define a UE operation.

Processing of UCI on Overlapped Multiple UL Channels Having Different TTI Length/Numerology/Processing Time When transmission timings of multiple UL channels having a different TTI length and/or processing time and/or numerology are overlapped, it is able to define a rule that UCI of a specific type of a specific UL channel is to be mapped by performing puncturing on a piggybacked channel. For example, when a transmission timing of PUSCH or PUCCH having a length of 1 ms TTI is overlapped with a transmission timing of PUSCH having a TTI length shorter than 1 ms and UCI of the PUSCH or the PUCCH having a TTI length of 1 ms is transmitted in a manner of being piggybacked on sPUSCH, if the UCI corresponds to an RI (and/or CQI/PMI and/or CRI), the UCI can be transmitted by performing puncturing on an RE supposed to be originally transmitted on the sPUSCH. The method above can be usefully used when UL grant-to-UL data timing of sPUSCH is not sufficient for calculating UCI of 1 ms TTI channel and mapping the UCI by performing rate matching.

Method of Transmitting UCI on Overlapped Multiple UL Channels Having Different TTI Length When transmission timing of sTTI PUSCH, transmission timing of PUSCH having a TTI length longer than a TTI length of the sTTI PUSCH, and transmission timing of PUCCH (e.g., 1 ms TTI PUSCH/PUCCH) are overlapped, it is necessary to define a method of transmitting UCI. Embodiments of the UCI transmission method are described in the following.

Proposal 1: All or a part of UCI is transmitted on sPUSCH. It is able to define a rule that joint encoding is to be applied to the UCI to be transmitted on the sPUSCH (for the same UCI type at least). In general, it is able to expect better performance via coding gain compared to UCI individual coding.

Proposal 2: While all or a part of UCI is transmitted on sPUSCH, individual coding is applied based on a TTI length or a TTI length group. In this case, when sPUSCH RE mapping of the UCI is performed, it is able to define a rule that UCI of a channel having a shorter TTI length (similarly, bigger numerology or shorter processing time) can be preferentially mapped to a preceding RE index. As a different method, when a dynamic codebook size is supported, it is able to define a rule that the maximum number of REs to which UCI is to be mapped is always calculated and puncturing or rate matching is to be performed on sPUSCH data.

Proposal 3: When all or a part of UCI is transmitted on sPUSCH, it is able to define a rule that (spatial) bundling is to be performed on UCI (e.g., HARQ-ACK) of a channel having a longer TTI length (similarly, bigger numerology or shorter processing time). Specifically, whether to perform the bundling operation can be determined based on a UCI payload size of a channel having a longer TTI length (similarly, bigger numerology or shorter processing time) and/or the number of PRBs allocated to sPUSCH and/or MCS of sPUSCH and/or a TTI length/numerology/processing time difference and/or a TTI length of sPUSCH/numerology/processing time, and the like.

UCI Transmission when Uplink Control Channel and Uplink Data Channel are Simultaneously Transmitted When simultaneous transmission of multiple UL channels (e.g., simultaneous transmission of PUCCH/PUSCH and/or simultaneous transmission of sPUCCH/sPUSCH and/or simultaneous transmission of multiple UL channels having a different TTI length/numerology/processing time) is set to a UE, it is able to define a rule that UCI is to be transmitted on a channel in which the UCI is originally included irrespective of whether or not HARQ-ACK and CSI simultaneous transmission are configured by higher layer or only when HARQ-ACK and CSI simultaneous transmission are configured.

Or, it is able to define a rule that the UE transmits UCI of a channel having a shorter TTI length (bigger numerology or shorter processing time) only irrespective of whether or not HARQ-ACK and CSI simultaneous transmission are configured by higher layer. Or, the UE can always determine a channel on which UCI is to be transmitted based on a UCI type. For example, it is able to define a rule that HARQ-ACK is to be transmitted on a channel having a shorter TTI length (bigger numerology or shorter processing time) and CSI is to be transmitted on a channel having a longer TTI length (smaller numerology or longer processing time).

As a different method, when transmission timings of a data channel and a control channel having a different TTI length/numerology/processing time are overlapped, it is able to define a rule that UCI of the data channel is always to be transmitted only and UCI of the control channel is to be dropped. The rule can be always applied irrespective of whether or not simultaneous transmission is configured.

UCI Transmission of Overlapped Multiple Channels Having Different Numerology and/or TTI Length and/or Processing Time When transmission timings of multiple UL channels having a different numerology and/or TTI length and/or processing time are overlapped in time, all or a part of a channel (channel 1) having a specific numerology and/or TTI length and/or processing time is dropped/terminated and the remaining channel (channel 2) can be transmitted only. More specifically, when transmission timing of a channel 1 having a longer TTI length is overlapped with transmission timing of a channel 2 (group) having a TTI length shorter than the TTI length of the channel 1, the present invention proposes a method of transmitting all or a part of UCI of the channel 1 on the channel 2. For example, the abovementioned case may include a case that transmission timing of 1 ms TTI PUSCH (or PUCCH) is overlapped with transmission timing of a plurality of 2-symbol TTI sPUSCH (or sPUCCH or a combination of sPUSCH and SPUCCH) in a specific subframe.

Proposal 1: It is able to define a rule that a channel to be piggybacked is determined from among a plurality of channel 2s based on a UCI type of the channel 1. Specifically, it is able to define a rule that a channel 2 having a higher priority can be determined as a channel to be piggybacked from among a plurality of channel 2s in a descending order of a priority of a UCI type of a channel 1. For example, UCI (e.g., HARQ-ACK) of a channel 1 having a higher priority can be piggybacked on a channel 2 having a high priority among a plurality of channel 2s. In this case, a priority of the channel 2 can be defined by an order described in the following: "sPUSCH with self-contained DM-RS">sPUCCH>"sPUSCH without self-contained DM- RS" or "sPUSCH with self-contained DM-RS">"sPUSCH without self-contained DM-RS">sPUCCH.

More generally, it is able to define a rule that UCI of a channel 1 is preferentially to be piggybacked on a channel 2 having a higher priority among a plurality of channel 2s. In this case, it is able to define a rule that the whole of the UCI of the channel 1 is to be piggybacked on the channel 2 without being dropped. Or, only a part having a high priority of the UCI can be piggybacked on a plurality of channel 2s. And, it is able to define a rule that all or a part of the UCI of the channel 1 is to be piggybacked on a part of channels having a high priority only among a plurality of channel 2s. A priority based on a UCI type of the channel 1 can be defined as 'HARQ-ACK>RI>CQI/PMI'.

Proposal 2: As a different method, it is able to define a rule that piggyback is to be performed based on a transmission time order of a channel to be piggybacked among a plurality of channel 2s in a descending order of a priority of a UCI type of a channel 1. For example, it is able to define a rule that HARQ-ACK of the channel 1 is to be preferentially piggybacked on a firstly overlapped channel among a plurality of channel 2s and an RI and/or CQI/PMI of the channel 1 are to be sequentially piggybacked on a next overlapped channel.

Proposal 3: It is able to define a rule that a UCI type of a channel 1 to be piggybacked is determined based on TTI lengths of a plurality of channel 2s overlapped with the channel 1. For example, when a plurality of channel 2s overlapped with the channel have a different TTI length, an RI and/or CQI/PMI of the channel 1 can be piggybacked on a sTTI UL channel having a longer TTI length among a plurality of the channel 2s. Meanwhile, HARQ-ACK of the channel 1 can be piggybacked on a sTTI UL channel having a shorter TTI length among a plurality of the channel 2s.

Proposal 4: Whether or not UCI of a channel 1 is to be repeatedly piggybacked on a plurality of channel 2s can be promised/defined in advance or can be configured via higher layer signaling based on a UCI type of the channel 1. For example, HARQ-ACK of the channel 1 can be repeatedly piggybacked on all (or a part of) channel 2s when the channel 1 is overlapped with a plurality of channel 2s. Specifically, it is able to define a rule that an operation of piggybacking UCI of the channel 1 is to be applied to a DMRS self-containing sTTI channel only among the plurality of channel 2s. On the contrary, it is able to define a rule that the operation of piggybacking UCI of the channel 1 is to be applied to a sTTI channel not including a DMRS only among the plurality of channel 2s. In case of the DMRS self-containing sTTI, since accuracy of channel estimation increases, it is able to more reliably transmit UCI. However, since a coding rate of the DMRS self-containing sTTI is relatively higher than a coding rate of the sTTI not including a DMRS, it may consider that there is a tradeoff relationship between the DMRS self-containing sTTI and the sTTI not including a DMRS. Hence, it is able to define one of the two rules is to be applied in advance and a UE can perform a piggyback operation based on the applied rule. Or, a network can configure one of the rules via higher layer signaling (or physical layer signaling).

And, it is able to define a UE operation for a case that UCI of a channel 1 is transmitted in a manner of being piggybacked on all or a part of a plurality of channel 2s by a combination of all (or a part of) the aforementioned proposals.

Figure 9:
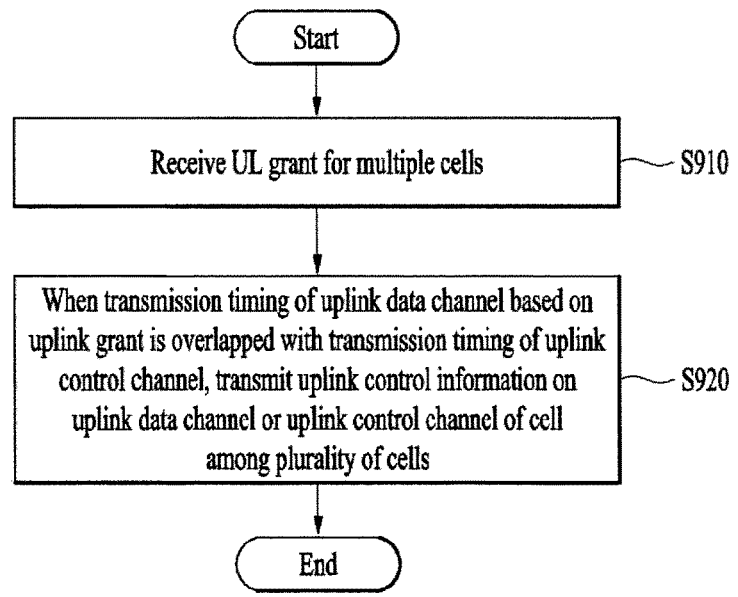
FIG. 9 illustrates an operation of a UE.

FIG. 9 illustrates an operation of a UE according to embodiments of the present invention. FIG. 9 is a flowchart for a method of transmitting uplink control information for a UE configured to support one or more TTI (transmission time interval) lengths.

The UE can receive an uplink grant for a plurality of cells [S910]. When a transmission timing of an uplink data channel based on the uplink grant is overlapped with a transmission timing of an uplink control channel, the UE can transmit uplink control information on an uplink data channel or the uplink control channel of a cell among the plurality of cells based on a relationship between a TTI length of the uplink data channel and a TTI length of the uplink control channel [S920].

When the TTI length of the uplink data channel is shorter than the TTI length of the uplink control channel, the uplink control information can be transmitted on a cell on which an uplink data channel having the shortest TTI length is transmitted among the plurality of cells. And, when the plurality of cells transmit uplink data channels having the same TTI length, the uplink control information can be transmitted in a predetermined cell determined by a predetermined rule. Moreover, when the TTI length of the uplink data channel is equal to or greater than a predetermined value, the uplink control information can be transmitted on the cell on which the uplink data channel having the shortest TTI length is transmitted among the plurality of cells.

In addition, when the TTI length of the uplink control channel is equal to or less than a predetermined value, uplink control information transmitted on an uplink data channel of a cell of the plurality of cells corresponds to a part of uplink control information to be transmitted on the control channel. When the uplink data channel and the uplink control channel are simultaneously transmitted in a subframe, the remaining uplink control information other than the part of the uplink control information is transmitted or dropped on the uplink control channel. When the uplink data channel and the uplink control channel are not simultaneously transmitted in a subframe, the remaining uplink control information can be dropped.

And, when the uplink data channel and the uplink control channel are not simultaneously transmitted in a subframe, the uplink data channel is dropped and the uplink control information can be transmitted on the uplink control channel.

Or, when the TTI length of the uplink data channel is equal to or longer than the TTI length of the uplink control channel and the TTI length of the uplink control channel is equal to or shorter than a predetermined value, the uplink control information can be transmitted on a cell on which an uplink data channel having the shortest TTI length is transmitted among the plurality of cells.

Or, when the TTI length of the uplink data channel is equal to or longer than the TTI length of the uplink control channel and the TTI length of the uplink control channel is equal to or shorter than a predetermined value, a part of uplink control information to be transmitted on the control channel can be transmitted on a cell on which an uplink data channel having the shortest TTI length is transmitted among the plurality of cells.

Additionally, when the uplink data channel and the uplink control channel are simultaneously transmitted in a subframe, the remaining uplink control information other than the part of the uplink control information is transmitted or dropped on the uplink control channel. When the uplink data channel and the uplink control channel are not simultaneously transmitted in a subframe, the remaining uplink control information can be dropped. Or, when the uplink data channel and the uplink control channel are not simultaneously transmitted in a subframe, the uplink data channel is dropped and all or a part of the uplink control information can be transmitted on the uplink control channel. Or, the uplink data channel is dropped and a part of the uplink control information can be transmitted on the uplink control channel irrespective of whether or not the uplink data channel and the uplink control channel are simultaneously transmitted in a subframe.

In the foregoing description, embodiments of the present invention have been briefly explained with reference to FIG. 9. An embodiment related to FIG. 9 can alternatively or additionally include at least a part of the aforementioned embodiments.

Figure 10:
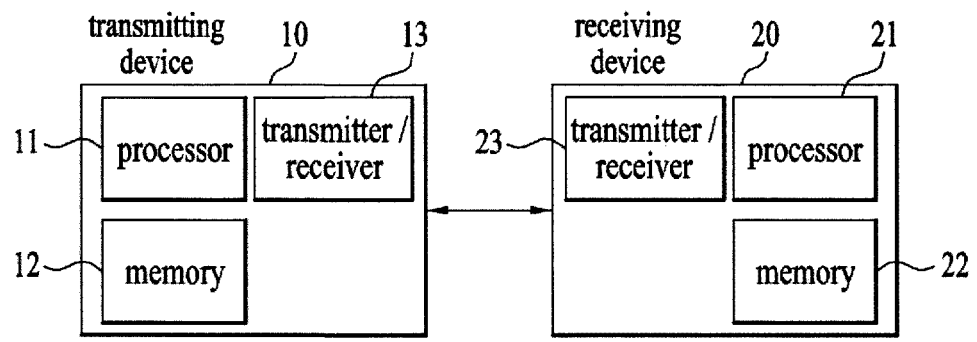
FIG. 10 is a block diagram of a device for implementing embodiment(s) of the present invention.

FIG. 10 is a block diagram of a transmitting device 10 and a receiving device 20 configured to implement exemplary embodiments of the present invention. Referring to FIG. 10, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An transmitter/receiver supporting a MIMO function of transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or the receiving device may be configured as a combination of one or more embodiments of the present invention.

It will be apparent to those skilled in the art that various modifications and variations can be made in the present invention without departing from the scope of the invention. Thus, it is intended that the present invention covers the modifications and variations of this invention provided they come within the scope of the appended claims and their equivalents.

INDUSTRIAL APPLICABILITY

The present invention is applicable to wireless communication devices such as a terminal, a relay, and a base station.

What is claimed is:

1. A method of transmitting uplink control information for a terminal configured to support one or more TTI (transmission time interval) lengths in a wireless communication system, the method being performed by the terminal and comprising:

determining whether a physical uplink control channel (PUCCH) on a first transmission time interval (TTI)

collides with a physical uplink shared channel (PUSCH) on a second TTI; and based on (i) that the PUCCH is used to convey hybrid automatic repeat request (HARQ) acknowledgement/ negative-acknowledgement (ACK/NACK) and (ii) that the PUCCH collides with the PUSCH, transmitting the HARQ ACK/NACK through the PUSCH, wherein the PUCCH on the first TTI is dropped, and wherein a length of the first TTI is greater than a length of the second TTI.

2. The method of claim 1, wherein the HARQ ACK/NACK is transmitted on a cell on which a PUSCH having the shortest TTI length is transmitted among a plurality of cells.

3. The method of claim 2, wherein when the plurality of cells transmit PUSCH having the same TTI length, uplink control information is transmitted in a predetermined cell determined by a predetermined rule.

4. The method of claim 2, wherein when the length of the first TTI is equal to or less than a predetermined value, uplink control information transmitted on a PUSCH of a cell of the plurality of cells corresponds to a part of uplink control information to be transmitted on the PUCCH.

5. The method of claim 4, wherein when the PUSCH and the PUCCH are simultaneously transmitted in a subframe, the remaining uplink control information other than the part of the uplink control information is transmitted or dropped on the PUCCH, and wherein when the PUSCH and the PUCCH are not simultaneously transmitted in a subframe, the remaining uplink control information is dropped.

6. The method of claim 1, further comprising:

receiving, information on the length of the second TTI via higher layer signaling.

7. A terminal configured to support one or more TTI (transmission time interval) lengths and transmit uplink control information in a wireless communication system, comprising:

a transmitter and a receiver; and a processor that controls the transmitter and the receiver, wherein the processor is configured to determine whether a physical uplink control channel (PUCCH) on a first transmission time interval (TTI) collides with a physical uplink shared channel (PUSCH) on a second TTI, wherein based on (i) that the PUCCH is used to convey hybrid automatic repeat request (HARQ) acknowledgement/negative-acknowledgement (ACK/NACK) and (ii) that the PUCCH collides with the PUSCH, the transmitter is configured to transmit the HARQ ACK/NACK through the PUSCH, wherein the HARQ ACK/NACK is related with the PUCCH, wherein the PUCCH on the first TTI is dropped, and wherein a length of the first TTI is greater than a length of the second TTI.

8. The terminal of claim 7, wherein the receiver is configured to receive information on the length of the second TTI via higher layer signaling.

* * * * *